United States Patent
Chen

(10) Patent No.: US 8,482,671 B1
(45) Date of Patent: Jul. 9, 2013

(54) TELEVISION AND TELEVISION CONTROL METHOD

(75) Inventor: Hong-Sheng Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/479,278

(22) Filed: May 24, 2012

(30) Foreign Application Priority Data

Mar. 1, 2012 (TW) .............................. 101106625 A

(51) Int. Cl.
*H04N 5/445* (2011.01)
*H04N 5/50* (2006.01)

(52) U.S. Cl.
USPC .......................................... 348/563; 348/569

(58) Field of Classification Search
USPC .... 348/563, 569, 570, 553, 725, 734; 725/37, 725/39, 40, 43, 44, 46, 47, 51, 52

IPC ....................................... H04N 5/445, 5/50, 5/44
See application file for complete search history.

(56) References Cited

U.S. PATENT DOCUMENTS

| | | | |
|---|---|---|---|
| 2009/0276808 A1* | 11/2009 | Jerding et al. | 725/47 |
| 2010/0180300 A1* | 7/2010 | Carpenter et al. | 725/40 |
| 2011/0209180 A1* | 8/2011 | Ellis et al. | 725/39 |

* cited by examiner

*Primary Examiner* — Sherrie Hsia
(74) *Attorney, Agent, or Firm* — Altis Law Group, Inc.

(57) ABSTRACT

An exemplary television control method includes receiving a signal. Then, the method determines the one or more of the applications of the television has a state indication function when the received signal is a first signal. The method next obtains the current state of the applications which have a state indication function. The method controls the display unit to display selectable notifications according to the current state of the determined applications. Each of the selectable notifications informs a user of the current state of one application.

16 Claims, 4 Drawing Sheets

TELEVISION AND TELEVISION CONTROL METHOD

BACKGROUND

1. Technical Field

The present disclosure relates to televisions and television control methods, and particularly, to a television capable of displaying the state of the applications of the TV and a television control method for displaying the state of the applications.

2. Description of Related Art

Many televisions integrate the ANDROID operating system developed by GOOGLE, and that operating system allows a number of applications to provide functions, such as games, an email program/client, downloading capabilities, and the like. However, such a television can only provide an interface displaying icons corresponding to applications of the television for the user to select. When the user wants to learn the state of one application, the user must open the application. For example, when the user wants to know whether there is unread email in the email box, the user must enter into the email box application, and further when the user wants to know the state of download of a movie, the user must first exit the email box and then enter into the downloading application, which will make the operation complex and waste the user time.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The embodiments of the present disclosure are described with reference to the accompanying drawings.

Figure 1:
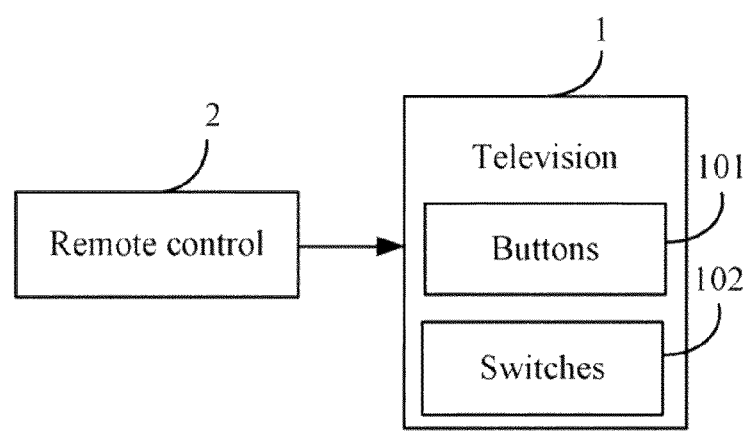
FIG. 1 is a block diagram of a television control system in accordance with an exemplary embodiment.

FIG. 1 is a schematic diagram illustrates a television (TV) 1. The TV 1 can be operated by a remote control 2 and by several buttons 101 of the TV 1. The TV 1 includes a number of applications that provides different functions, such as games, email processing, downloading, and the like. Some of the applications include a state indication function that are capable of indicating the state of the application and are capable of updating the current state of the applications. For example, email processing application is capable of updating the number of unread emails, and the downloading application is capable of updating the downloaded/download remaining state, and the Facebook application is capable of updating unread messages sent by friends. In the embodiment, the TV 1 integrates the ANDROID operating system. When a television program is shown on the TV 1, the TV 1 is capable of displaying the current state of applications in response to user operation by means of the remote control 2 or by means of the buttons 101.

Figure 2:
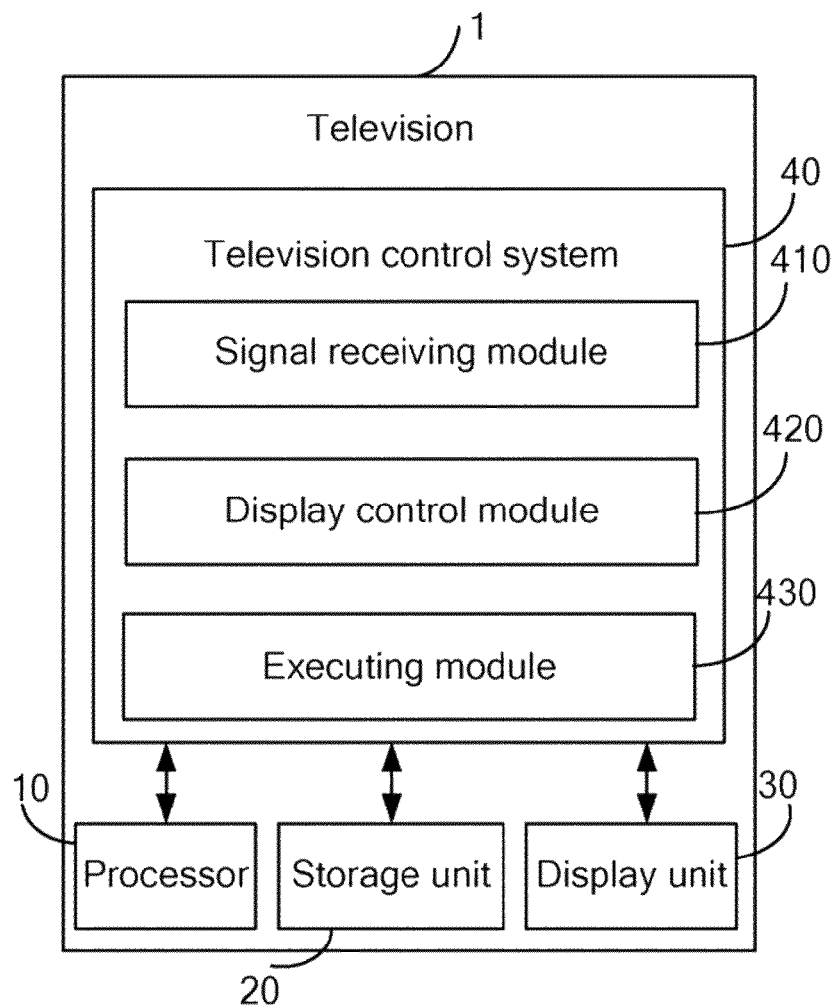
FIG. 2 is a block diagram of a television in accordance with an exemplary embodiment.

Referring to FIG. 2, the TV 1 includes a processor 10, a storage unit 20, a display unit 30, and a television control system 40. In the embodiment, the television control system 40 includes a signal receiving module 410 and a display control module 420. One or more programs of the above function modules may be stored in the storage unit 20 and executed by the processor 10. In general, the word "module," as used herein, refers to logic embodied in hardware or firmware, or to a collection of software instructions, written in a programming language. The software instructions in the modules may be embedded in firmware, such as in an erasable programmable read-only memory (EPROM) device. The modules described herein may be implemented as either software and/or hardware modules and may be stored in any type of computer-readable medium or other storage device.

The signal receiving module 410 is to receive signals from the remote control 2 or from the switches 102 actuated by the buttons 101.

Figure 3:
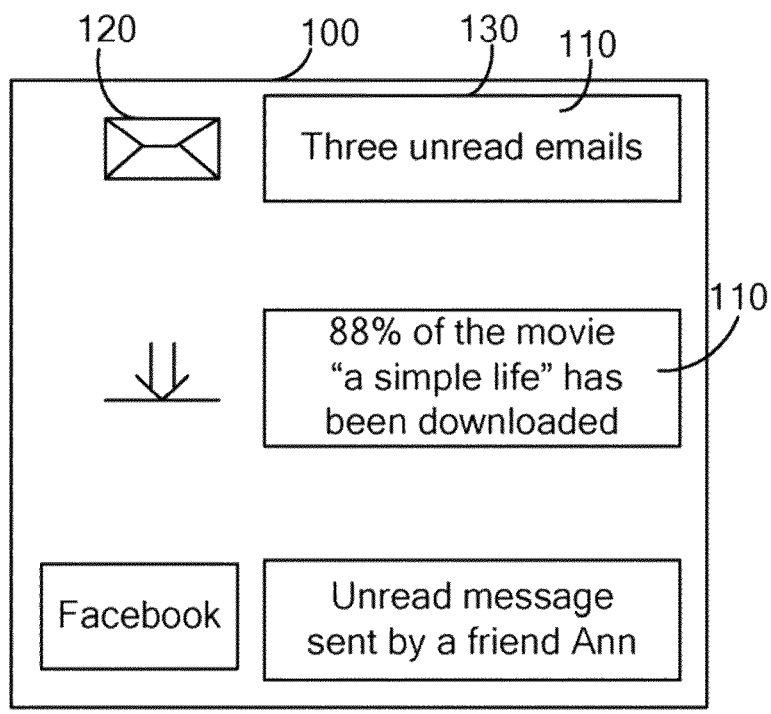
FIG. 3 is a schematic view showing a interface of the television of FIG. 2.

The display control module 420 is to determine which of the applications of the TV 1 include a state indication function when the signal receiving module 410 receives a first signal. The display control module 420 further obtains the current state of the determined applications having a state indication function and controls the display unit 30 to display an interface 100 showing a number of selectable notifications 110 according to the obtained current state of the determined applications (see FIG. 3). Each of the selectable notifications 110 can inform a user of the state of one application. The selectable notifications 110 are displayed in a preset order. For example, the display unit 30 displays from top to bottom the selectable notifications 110 of "three unread emails", "88% of the movie "a simple life" has been downloaded", and "one unread message sent by a friend Ann on the Facebook". In the embodiment, the display control module 420 controls the display unit 30 to display a selectable box 130 in which one selectable notification 110 is highlighted to identify the one selectable notification 110 is a current selectable notification 110.

In the embodiment, the display control module 420 further controls the display unit 30 to display icons 120 of the applications having the state indication function. Each icon 120 corresponds to one selectable notification 110. In other embodiments, the display control module 420 obtains the current state of one or more preset applications of the TV 1 having a state indication function and controls the display unit 30 to display selectable notifications 110 of the current state of the one or more preset applications when the signal receiving module 410 receives a first signal.

The television control module 40 further includes an executing module 430. The executing module 430 executes the application corresponding to the current selectable notification 110 when the signal receiving module 410 receives a second signal. For example, when the current selectable notification 110 indicating "three unread emails" is selected, the executing module 430 runs the email processing application and controls the display unit 30 to open and display the contents of the three unread emails.

The executing module 430 can further move the selectable box 130 from a current selectable notification 110 to a previous selectable notification 110 when the signal receiving module 410 receives a third signal. For example, referring to FIG. 3, when the current selectable notification 110 is "88% of download of the movie "a simple life" has been downloaded", the executing module 430 can move the selectable box 130 from the current selectable notification 110 of "88% of the movie "a simple life" has downloaded" to the previous selectable notification 110 of "three unread emails" according to the received third signal.

The executing module 430 can further move the selectable box 130 from a current selectable notification 110 to a next selectable notification 110 when the signal receiving module 410 receives a fourth signal. For example, referring to FIG. 3, when the current selectable notification 110 is "three unread emails", the executing module 430 can move the selectable box 130 from the current selectable notification 110 of "three unread emails" to the next selectable notification 110 of "movie "a simple life" has downloaded 88%" according to the received fourth signal.

The executing module 430 can control the display unit 30 to switch from a currently displayed content to a previously displayed content when the signal receiving module 410 receives a fifth signal. For example, after the executing module 430 has run the email processing application and controlled the display unit 30 to open and display the content of the unread emails, the executing module 430 controls the display unit 30 to display the selectable notification 110 of "three unread emails" in response to the received fifth signal.

Figure 4:
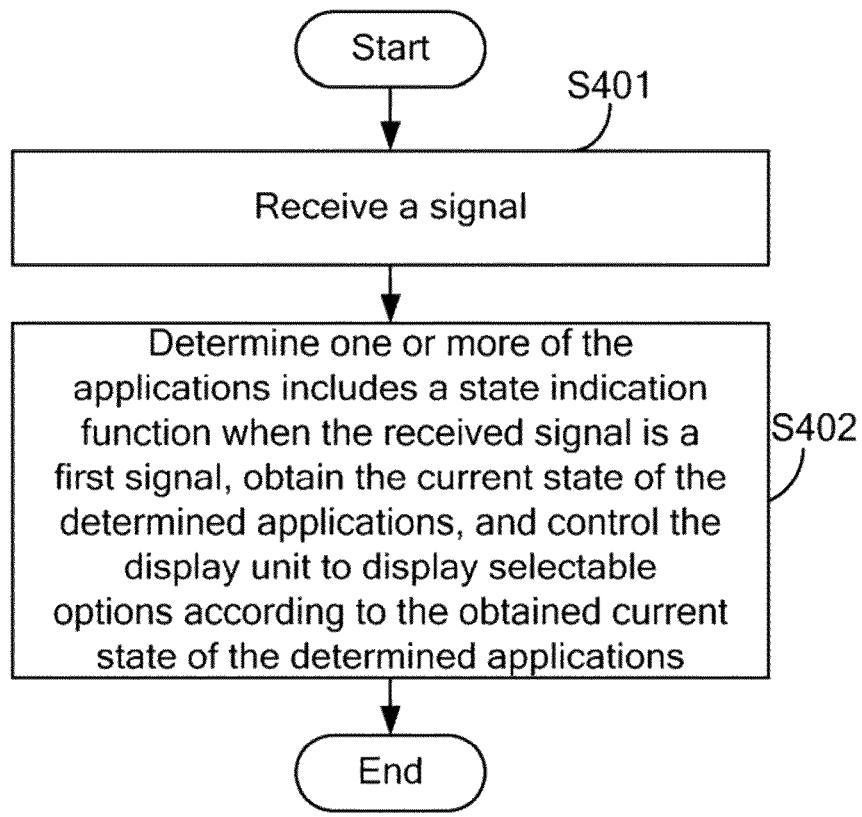
FIG. 4 is a flowchart of a television control method in accordance with an exemplary embodiment.

FIG. 4 shows a flowchart of a television control method, in accordance with an embodiment.

In step S401, the signal receiving module 410 receives a signal from the remote control 2 or from the switches 102 actuated by the buttons 101 of the TV 1.

In step S402, the display control module 420 determines which of the applications installed in the TV 1 includes a state indication function when the signal received by the signal receiving module 410 is a first signal, obtains the current state of the determined applications having a state indication function, and controls the display unit 30 to display an interface 100 showing selectable notifications 110 according to the obtained current state of the determined applications. Each selectable notification 110 informs a user of the state of one application. In the embodiment, the display control module 420 further controls the display unit 30 to simultaneously display icons 120 of the applications having a state indication function when the display unit 30 displays the selectable notifications 110. Each icon 120 corresponds to one selectable notification 110. In other embodiments, the display control module 420 obtains the current state of certain preset applications of the TV 1 having a state indication function and controls the display unit 30 to display selectable notifications 110 of the current state of the such preset applications when the signal receiving module 410 receives a first signal.

In the embodiment, the display control module 420 controls the display unit 30 to display a selectable box 130 in which one selectable notification 110 is highlighted to identify the one selectable notification 110 is a current selectable notification 110.

In the embodiment, the executing module 430 executes the application corresponding to the current selectable notification 110 when the signal received by the signal receiving module 410 is a second signal.

In the embodiment, the executing module 430 moves the selectable box 130 from the current selectable notification 110 to a previous selectable notification 110 when the signal received by the signal receiving module 410 is a third signal.

In the embodiment, the executing module 430 moves the selectable box 130 from the current selectable notification 110 to the next selectable notification 110 when the signal received by the signal receiving module 410 is a fourth signal.

In the embodiment, the executing module 430 can further control the display unit 30 to switch from a currently displayed content to a previously displayed content when the signal received by the signal receiving module 410 is a fifth signal.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A television installed with a plurality of applications to provide different functions, one or more of the applications comprising state indication functions that being capable of indicating the state of the applications and being capable of updating a current state of the applications, the television comprising:
    a storage unit;
    a processor;
    a display unit;
    one or more programs stored in the storage unit, executable by the processor, the one or more programs comprising:
        a signal receiving module operable to receive signals; and
        a display control module operable to determine the one or more of the applications of the television comprising state indication function upon a condition that the signal receiving module receives a first signal, obtain the current state of each of the one or more applications, and control the display unit to display one or more selectable notifications according to the obtained current states of the determined one or more applications, each of the one or more selectable notifications informing a user of the current state of one application.

2. The television as described in claim 1, wherein the display control module is further operable to control the display unit to simultaneously display one or more icons of the one or more applications having state indication function when the display control module controls the display unit to display the one or more selectable notifications, each of the icons corresponds to one of the selectable notifications.

3. The television as described in claim 1, wherein the signal received by the signal receiving module is sent by a remote control or switches actuated by buttons of the television.

4. The television as described in claim 1, wherein the display control module is further operable to control the display unit to display a selectable box in which one selectable notification is highlighted to identify the one selectable notification is a current selectable notification.

5. The television as described in claim 4 further comprising an executing module, wherein the executing module is further operable to execute the application corresponding to the current selectable notification when the signal receiving module receives a second signal.

6. The television as described in claim 4 further comprising an executing module, wherein the executing module is further operable to move the selectable box from the current selectable notification to a previous selectable notification when the signal receiving module receives a third signal.

7. The television as described in claim 4 further comprising an executing module, wherein the executing module is further operable to move the selectable box from the current selectable notification to a previous selectable notification when the signal receiving module receives a fourth signal.

8. The television as described in claim 1 further comprising an executing module, wherein the executing module is further operable to control the display unit to switch from a currently displayed content to a previously displayed content when the signal receiving module receives a fifth signal.

9. A television control method implemented by a television, the television installed with a plurality of applications to provide different functions, one or more of applications comprising state indication functions that being capable of indicating the state of the applications and being capable of updating a current state of the applications, the television comprising a display unit, the television control method comprising:

receiving a signal; and determining the one or more of the applications of the television comprising state indication function upon the received signal is a first signal, obtaining the current state of the each of the determined one or more applications, and then controlling the display unit to display one or more selectable notifications according to the obtained current states of the determined one or more applications, each of the one or more selectable notifications informing a user of the current state of one application.

10. The television control method as described in claim 9, further comprising:

controlling the display unit to simultaneously display one or more icons of the one or more applications having state indication function when the display unit is controlled to display the one or more selectable notifications, each of the icons corresponding to one of the selectable notifications.

11. The television control method as described in claim 9, further comprising:

receiving signals from a remote control or switches activated by buttons of the television.

12. The television control method as described in claim 9, further comprising:

controlling the display unit to display a selectable box in which one selectable notification is highlighted to identify the one selectable notification is a selectable current notification.

13. The television control method as described in claim 12, wherein the method further comprises:

executing the application corresponding to the current selectable notification when the received signal is a second signal.

14. The television control method as described in claim 12, further comprising:

moving the selectable box from the current selectable notification to a previous selectable notification when the received signal is a third signal.

15. The television control method as described in claim 12, further comprising:

moving the selectable box from the current selectable notification to a previous selectable notification when the received signal is a fourth signal.

16. The television control method as described in claim 9, further comprising:

controlling the display unit to switch from a currently displayed content to a previously displayed content when the received signal is a fifth signal.

* * * * *